(12) United States Patent
Valente

(10) Patent No.: US 9,302,581 B1
(45) Date of Patent: Apr. 5, 2016

(54) ALL-WHEEL DRIVE DRIVELINE WITH DISCONNECTING AXLE

(71) Applicant: American Axle & Manufacturing, Inc., Detroit, MI (US)

(72) Inventor: Paul Joseph Valente, Detroit, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 14/511,301

(22) Filed: Oct. 10, 2014

(51) Int. Cl.
*F16H 48/34* (2012.01)
*B60K 17/35* (2006.01)
*B60K 23/08* (2006.01)
*F16D 27/112* (2006.01)

(52) U.S. Cl.
CPC ............ *B60K 17/35* (2013.01); *B60K 23/08* (2013.01); *F16D 27/112* (2013.01); *F16H 48/34* (2013.01)

(58) Field of Classification Search
CPC ........................................... F16H 48/34
See application file for complete search history.

(56) References Cited

U.S. PATENT DOCUMENTS

| | | | |
|---|---|---|---|
| 6,183,387 B1 * | 2/2001 | Yoshioka | B60K 23/04 475/88 |
| 6,578,654 B2 | 6/2003 | Porter | |
| 6,695,740 B2 | 2/2004 | Hibbler et al. | |
| 6,790,154 B1 * | 9/2004 | Kelley, Jr. | B60K 17/35 180/249 |
| 6,865,466 B2 | 3/2005 | Voight et al. | |
| 8,042,642 B2 | 10/2011 | Marsh et al. | |
| 8,047,323 B2 | 11/2011 | Downs et al. | |
| 8,215,440 B2 | 7/2012 | Hoffmann et al. | |
| 8,795,126 B2 | 8/2014 | Downs et al. | |
| 8,808,127 B2 | 8/2014 | Seidl et al. | |
| 2006/0046888 A1 * | 3/2006 | Puiu | B60K 17/16 475/151 |
| 2011/0275470 A1 | 11/2011 | Ekonen et al. | |
| 2013/0303324 A1 | 11/2013 | Valente et al. | |
| 2014/0251083 A1 * | 9/2014 | Suzuki | B60K 17/344 74/665 F |

* cited by examiner

*Primary Examiner* — Tisha Lewis
(74) *Attorney, Agent, or Firm* — Harness, Dickey & Pierce, P.L.C.

(57) ABSTRACT

A disconnecting driveline component can include a shaft coupled to one of a pair of output members of a differential. A clutch input can be coupled for rotation with one of a ring gear and the one of the output members. A clutch output can be coupled for rotation with one of a differential case and the shaft. A collar can be axially-slidable between a first position, where the collar couples the clutch input and the clutch output to transmit rotational power therebetween, and a second position where the collar is rotatably decoupled from one of the clutch input and the clutch output. A pilot input can be non-rotatably coupled to the clutch input. A pilot output can be fixed to the clutch output. An electromagnet can draw the pilot input into frictional engagement with the pilot output when the collar is in the second position.

20 Claims, 3 Drawing Sheets

ALL-WHEEL DRIVE DRIVELINE WITH DISCONNECTING AXLE

FIELD

The present disclosure relates to all-wheel drive drivelines with a disconnecting axle.

BACKGROUND

This section provides background information related to the present disclosure which is not necessarily prior art.

Disconnecting all-wheel drive vehicles are known in the art from various issued patents, such as U.S. Pat. No. 8,042,642 issued Oct. 25, 2011. Such disconnecting all-wheel drive vehicles employ a first disconnecting element in the front or primary driveline and a second disconnecting element in the rear or secondary driveline. It can be important in some instances that one or both of the first and second disconnecting elements exhibit a relatively low drag torque when not engaged (i.e., when not being used to actively transmit rotary power). It can also be important in some instances that one or both of the first and second disconnecting elements allow for rotational synchronization of the drive axle and the driveline before transmitting torque to the drive axles. Multi-plate wet clutches can serve as both a synchronizer and a torque transfer device. However, if one or both of the first and second disconnecting elements includes a multi-plate clutch pack, low drag is typically at least partially achieved by moving the clutch plates a sufficiently far distance from one another. In this regard, if the clutch plates are not separated by a sufficient distance, the disconnecting element can have a drag torque that can rival the drag torque of the (other) driveline components that are to be "disconnected".

As the disconnecting drivelines must typically be capable of transmitting relatively high torque, the clutch packs employed in such devices generally include a relatively high number of clutch plates. Due to the need for a relatively high normal force to transmit high torque through such clutch packs, one common approach is to employ a hydraulically-powered actuator, which is fed hydraulic fluid via a high pressure pump, for applying the normal force. In order to sufficiently space or separate a large quantity of clutch plates, the actuator that applies the normal force to the clutch pack must have a relatively long travel. Due to the magnitude of the normal force and the relatively long length of travel, such friction clutches have a relatively long engagement time (i.e., a length of time between the point in time at which the friction clutch begins to engage and the point in time at which the friction clutch is fully engaged).

In view of the above remarks, an improved driveline component that is capable of being disconnected is needed in the art.

SUMMARY

This section provides a general summary of the disclosure, and is not a comprehensive disclosure of its full scope or all of its features.

The present teachings provide for a d disconnecting driveline component including a housing, an input gear, a ring gear, a differential assembly, a stub shaft, an axle shaft, a clutch device, and a pilot clutch device. The input gear can be received in the housing. The ring gear can be received in the housing and can be meshingly engaged with the input gear to receive power therefrom. The ring gear can be rotatable about an axis. The differential assembly can be received in the housing and can include a differential case and a differential gearset. The differential case can be coupled to the ring gear for common rotation about the axis. The differential gearset can be coupled to the differential case to receive rotary power therefrom. The differential gearset can have a pair of output members. The stub shaft can be coupled to one of the pair of output members for rotation therewith about the axis. The clutch device can include a clutch input member, a clutch output member, a carrier, and a collar. The clutch input member can be coupled to the stub shaft for rotation therewith about the axis. The clutch output member can be coupled to the axle shaft for rotation therewith about the axis. The carrier can be axially movably but non-rotatably coupled to the clutch input member. The collar can be axially-slidably but non-rotatably coupled to one of the carrier and the clutch input member for movement along the axis between a first position, in which the collar can be coupled to the clutch output member to transmit rotational power therebetween, and a second position in which the collar can be rotatably decoupled from the clutch output member. The pilot clutch device can include a pilot input member, a pilot output member, and a pilot actuator. The pilot input member can be axially-slidably but non-rotatably coupled to the carrier. The pilot output member can being fixedly coupled to the clutch output member. The pilot actuator can be selectively operable for moving the pilot input member into frictional engagement with the pilot output member.

The present teachings further provide for a disconnecting driveline component including a housing, an input gear, a ring gear, a differential assembly, a clutch device, and a pilot clutch device. The input gear can be received in the housing. The ring gear can be received in the housing and can be meshingly engaged with the input gear to receive power therefrom. The ring gear can be rotatable about an axis. The differential assembly can be received in the housing and can include a differential case, and a differential gearset. The differential case can include a first case member, which can be coupled to the ring gear for common rotation about the axis, and a second case member. The differential gearset can be coupled to the second case member to receive rotary power therefrom. The differential gearset can have a pair of output members. The clutch device can include a clutch input member, a clutch output member, a carrier, and a collar. The clutch input member can be coupled to the first case member for rotation therewith about the axis. The clutch output member can be coupled to the second case member for rotation therewith about the axis. The carrier can be axially movably but non-rotatably coupled to the clutch input member. The collar can be axially-slidably but non-rotatably coupled to one of the carrier and the clutch input member for movement along the axis between a first position, in which the collar can be coupled to the clutch output member to transmit rotational power therebetween, and a second position in which the collar can be rotatably decoupled from the clutch output member. The pilot clutch device can include a pilot input member, a pilot output member, and a pilot actuator. The pilot input member can be axially-slidably but non-rotatably coupled to the carrier. The pilot output member can be fixedly coupled to the clutch output member. The pilot actuator can be selectively operable for moving the pilot input member into frictional engagement with the pilot output member.

The present teachings further provide a disconnecting driveline component including a housing, an input gear, a ring gear, a differential assembly, a shaft, a clutch device, and a pilot clutch device. The input gear can be received in the housing. The ring gear can be received in the housing and can be meshingly engaged with the input gear to receive power therefrom. The ring gear can be rotatable about an axis. The differential assembly can be received in the housing and can include a differential case and a differential gearset. The differential gearset can be coupled to the differential case to receive rotary power therefrom. The differential gearset can have a pair of output members. The shaft can be coupled to one of the pair of output members. The clutch device can be configured to selectively permit transmission of rotary power between the ring gear and the shaft. The clutch device can include a clutch input member, a clutch output member, and a collar. The clutch input member can be coupled for common rotation with one of the ring gear and the one of the pair of output members. The clutch output member can be coupled for common rotation with one of the differential case and the shaft. The collar can be axially-slidable along the axis between a first position, in which the collar couples the clutch input member to the clutch output member to transmit rotational power therebetween, and a second position in which the collar is rotatably decoupled from one of the clutch input member and the clutch output member. The pilot clutch device can include a pilot input member, a pilot output member, and an electromagnet. The pilot input member can be axially slidably but non-rotatably coupled to the carrier. The pilot output member can be fixed to the clutch output member. The electromagnet can be selectively operable for generating a magnetic field that can draw the pilot input member into frictional engagement with the pilot output member. The pilot clutch can couple the clutch input member to the clutch output member when the pilot input member frictionally engages the pilot output member and the collar is in the second position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
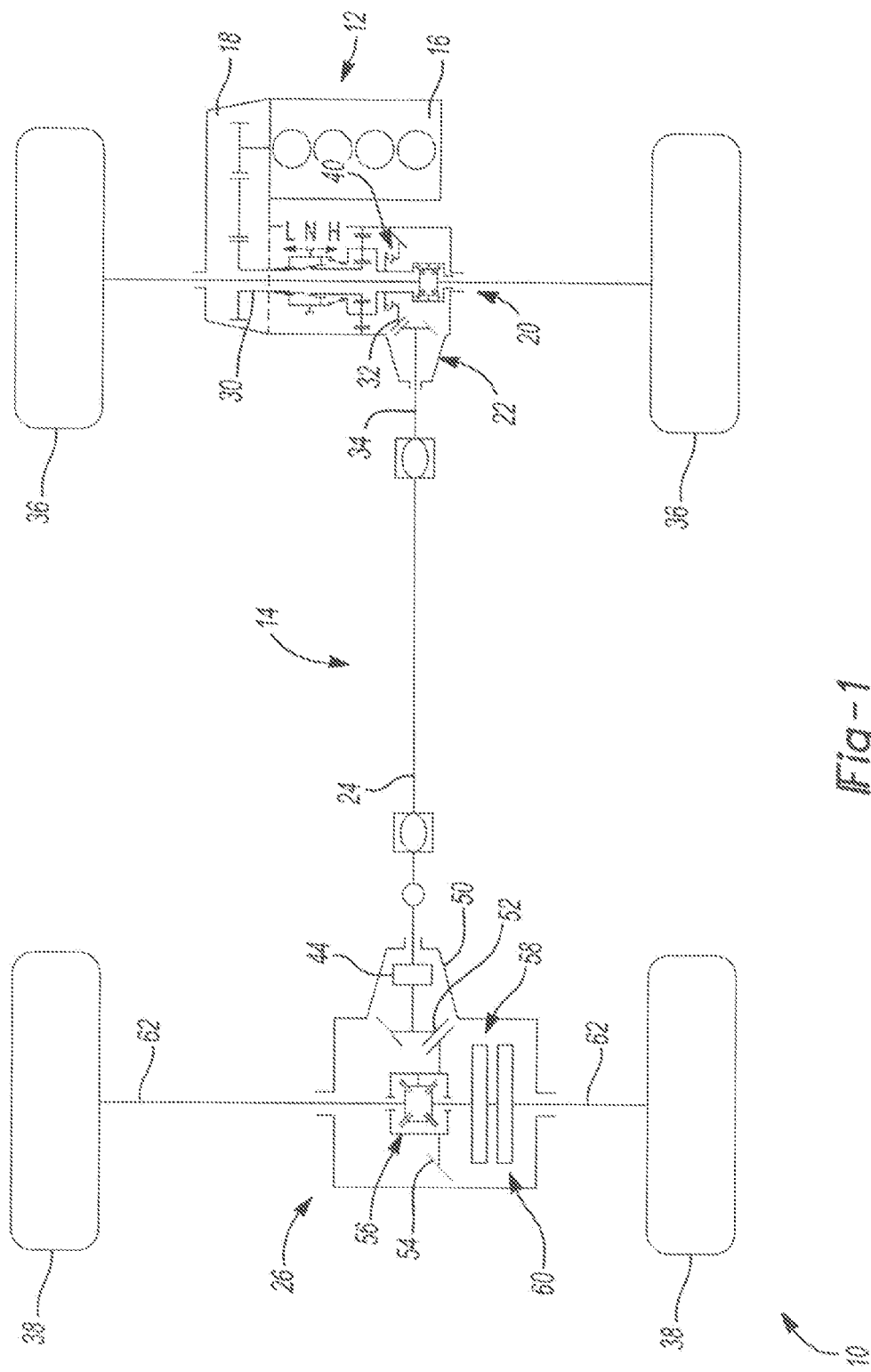
FIG. 1 is a schematic of a motor vehicle having an all-wheel drive system with a disconnecting driveline component constructed in accordance with the teachings of the present disclosure.

With reference to FIG. 1 of the drawings, an exemplary vehicle having a power transmitting component constructed in accordance with the teachings of the present disclosure is generally indicated by reference numeral 10. The vehicle 10 can have a power train 12 and a drive line or drive train 14. The power train 12 can be conventionally constructed and can include a power source 16 and a transmission 18. The power source 16 can be configured to provide propulsive power and can include an internal combustion engine and/or an electric motor, for example. The transmission 18 can receive propulsive power from the power source 16 and can output power to the drive train 14. The transmission 18 can have a plurality of automatically or manually-selected gear ratios. The drive train 14 in the particular example provided is of an all-wheel drive configuration, but those of skill in the art will appreciate that the teachings of the present disclosure are applicable to other drive train configurations, including four-wheel drive configurations, rear-wheel drive configurations, and front-wheel drive configurations.

The drive train 14 can include a front axle assembly 20, a power take-off unit (PTU) 22, a prop shaft 24 and a disconnecting driveline component 26. In the particular example provided, the disconnecting driveline component is a rear axle assembly, but it will be appreciated that the teachings of the present disclosure have application to other driveline components. An output of the transmission 18 can be coupled to an input of the front axle assembly 20 to drive an input member 30 of the front axle assembly 20. The front axle assembly 20 and the PTU 22 are described in more detail in commonly-assigned U.S. application Ser. No. 13/785,425, the disclosure of which is incorporated by reference as if fully set forth in detail herein. While described in U.S. application Ser. No. 13/785,425 and herein as a two-speed PTU, the PTU 22 can alternatively be configured in other ways, such as a single, or a multi-speed PTU for example. Briefly, the PTU 22 can have a PTU input member 32, which can receive rotary power from the input member 30 of the front axle assembly 20, and a PTU output member 34 that can transmit rotary power to the prop shaft 24. The prop shaft 24 can couple the PTU output member 34 to the rear axle assembly 26 such that rotary power output by the PTU 22 is received by the rear axle assembly 26. The front axle assembly 20 and the rear axle assembly 26 could be driven on a full-time basis to drive front and rear vehicle wheels 36 and 38, respectively. The drive train 14 can include one or more clutches to interrupt the transmission of rotary power through a part of the drive train 14 and/or modulate torque transferred through the drive train 14. In the example provided, the drive train 14 includes a PTU disconnect clutch 40, a torque modulating clutch 44, and a plurality of clutches which are incorporated into the rear axle assembly 26 as will be discussed in more detail below. The PTU disconnect clutch 40 can be configured to interrupt the transmission of rotary power into or through the PTU 22, and can be any type of clutch disposed between the input member 30 of the front axle assembly 20 and the PTU input member 32. The torque modulating clutch 44 can be configured to modulate torque between the PTU 22 and the rear axle assembly 26.

Figure 2:
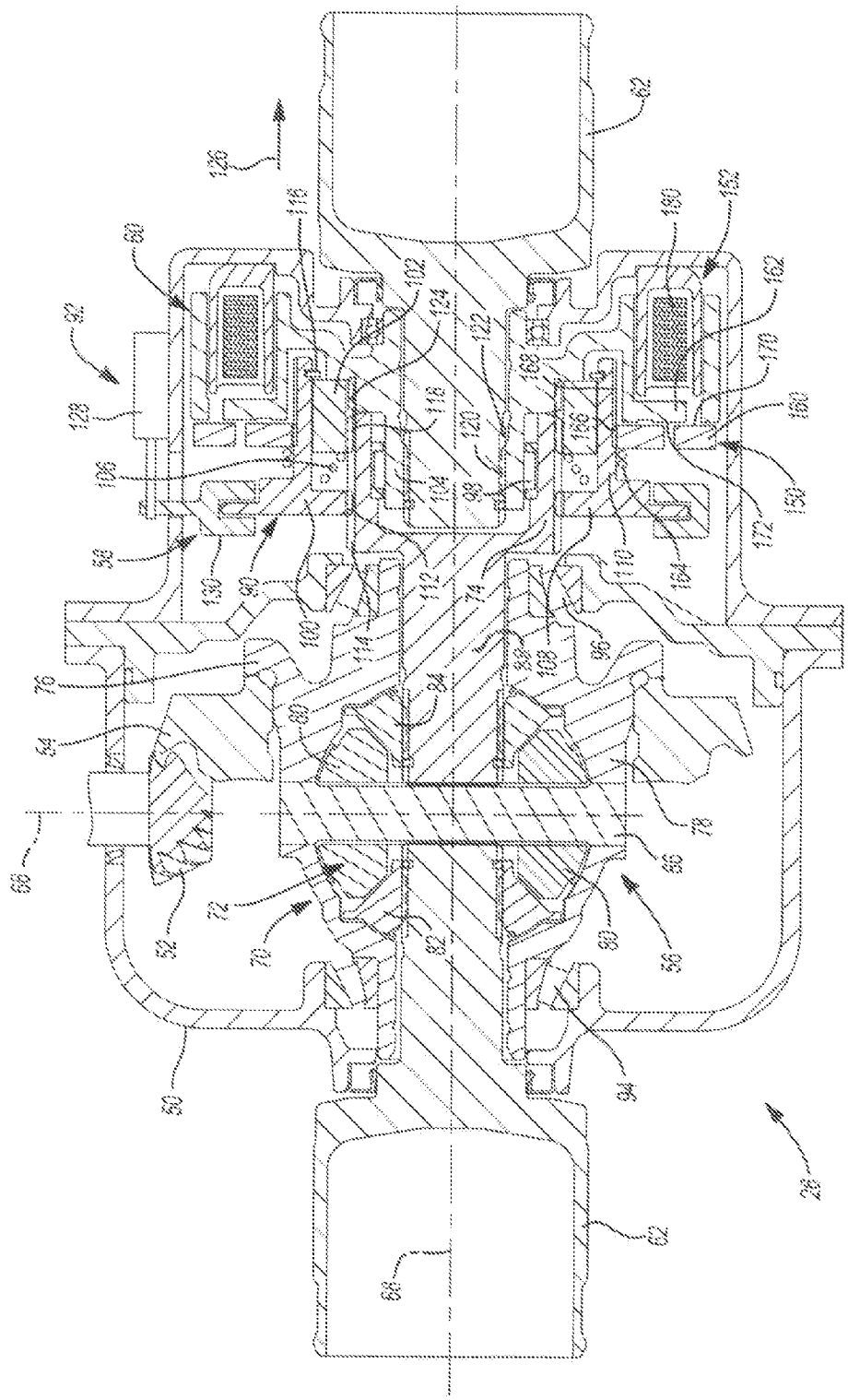
FIG. 2 is a sectional view of a portion of the disconnecting driveline component of FIG. 1.

With additional reference to FIG. 2, the rear axle assembly 26 can include a housing 50, an input pinion 52, a ring gear 54, a differential assembly 56, a first clutch mechanism 58, a second clutch mechanism 60, and a pair of axle shafts 62. The input pinion 52 can be conventionally housed in the housing 50 for rotation about an input pinion axis 66. The input pinion 52 can be coupled to the prop shaft 24 (FIG. 1) for rotation therewith. In the example provided, the torque modulating clutch 44 (FIG. 1) is a multi-plate, wet clutch disposed within the housing 50 between the prop shaft 24 and the input pinion 52 and configured to modulate torque transfer between the prop shaft 24 and the input pinion 52, though other configurations can be used. The ring gear 54 can be mounted in the housing 50 for rotation about a differential axis 68 that can be transverse, e.g., perpendicular, to the input pinion axis 66. The ring gear 54 can be meshingly engaged with the input pinion 52. The differential assembly 56 can be any means known in the art for transmitting rotary power in a torque path between the ring gear 54 and the axle shafts 62. In the particular example provided, the differential assembly 56 includes a differential case 70, a differential gearset 72, and a first input member 74. The differential case 70 can be supported within the housing 50 for rotation relative to the housing 50 by bearings 94, 96. In the example provided, bearings 94, 96 are disposed between the housing 50 and the differential case 70. The differential case 70 can include a first case member 76, which can be fixedly coupled to the ring gear 54, and a second case member 78. In the particular example provided, the first case member 76 is fixedly coupled to or unitarily formed with the second case member 78, and is concentrically disposed about the second case member 78. The differential gearset 72 can be mounted to the second case member 78 of the differential case 70 in a manner that permits rotary power to be transmitted therebetween. For example, the differential gearset 72 can include a pair of side gears 80, and first and second differential pinions 82, 84, that are meshingly engaged with the side gears 80. In the example provided, the side gears 80, which are rotatably mounted on a cross-pin 86 that is fixedly coupled to the second case member 78, and the differential pinions 82, 84 are bevel gears, with each of the differential pinions 82, 84 being meshingly engaged with both of the side gears 80. It will be appreciated, however, that other types of differential gearsets could be employed (e.g., helical gearsets in which pairs of the differential pinions have helical teeth that are meshed together and each one of the pair of differential pinions is meshed with the helical teeth of a corresponding one of the side gears). One of the axle shafts 62 can be coupled to the first differential pinion 82 for common rotation. The second differential pinion 84 can be fixedly coupled to the first input member 74 for common rotation therewith via a shaft (e.g., stub shaft 88).

Each of the first and second clutch mechanisms 58 and 60 can be employed to selectively couple the first input member 74 and the other axle shaft 62 to one another for common rotation. The first and second clutch mechanisms 58 and 60 can vary in their torque capacity (i.e., the amount of torque that can be transmitted from the input of the clutch to the output of the clutch in a predetermined rotational direction and at a predetermined rotational speed). For example, the first clutch mechanism 58 can have a first torque capacity that can be greater than a second torque capacity of the second clutch mechanism 60.

The first clutch mechanism 58 can include a first clutch 90 and a first clutch actuator 92. The first clutch 90 can include a carrier 100, a collar 102, a first output member 104, and a first clutch spring 106. The carrier 100 can have a base portion 108 and an extending portion 110 fixedly coupled to the base portion 108. The base portion 108 can have a generally plate or ring shape and can be non-rotatably, but axially slidably coupled to the first input member 74 for common rotation therewith. In the example provided, the base portion 108 is co-axially disposed about the first input member 74 and includes an interior spline or teeth 112 that is non-rotatably, but axially slidably engaged with an outer mating spline or teeth 114 formed on the first input member 74. The base portion 108 can extend radially outward from the first input member 74. The extending portion 110 can be co-axially disposed about the first input member 74 while being radially outward and spaced apart from the first input member 74. The extending portion 110 can have a generally tubular shape. The extending portion 110 can include a return member 116 configured to axially translate the collar 102 as will be discussed below. The return member 116 can extend radially inward from an end of the extending portion 110 distal to the base portion 108.

The collar 102 can be non-rotatably, but axially slidably coupled to the first input member 74 for common rotation therewith. In the example provided, the collar 102 is co-axially disposed about the first input member 74 and radially inward of the extending portion 110 of the carrier 100. The collar 102 can be slidably received within the tubular shape of the extending portion 110. In the example provided, the collar 102 includes an interior spline or teeth 118 that is non-rotatably, but axially slidably engaged with the outer mating spline 114 formed on the first input member 74. The collar 102 can be axially translated between a first position, in which the collar 102 is not engaged with the first output member 104, and a second position, in which the collar 102 is engaged with the first output member 104.

The first output member 104 can be coupled for common rotation with the other of the axle shafts 62 (i.e. the axle shaft 62 not coupled for common rotation with the first differential pinion 82). In the example provided, the first output member 104 is supported within a portion of the first input member 74 by bearing 98 and includes an inner spline or teeth 120 that is non-rotatably engaged with an outer spline or teeth 122 formed on the other of the axle shafts 62. The first output member 104 can include an outer spline or teeth 124 axially in-line with the outer mating spline 114 of the first input member 74 and configured to mate with the interior spline 118 of the collar 102. When the collar 102 is in the first position, the interior spline 118 can be engaged with the outer mating spline 114 and dis-engaged from the outer spline 124. The collar 102 can be a length such that the interior spline 118 can be engaged with both the outer mating spline 114 and the outer spline 124 when the collar 102 is in the second position, to couple the first input member 74 to the first output member 104 for common rotation.

The first clutch spring 106 can be disposed axially between the base portion 108 and the collar 102 and be configured to translate the collar 102 axially from the first position toward the second position when the carrier 100 is translated in a first axial direction 126. The first clutch spring 106 can allow for axial compliance, such that the first clutch spring 106 can compress if the interior spline 118 is not rotationally aligned with the outer spline 124 when the carrier 100 translates in the first axial direction 126. When the first clutch spring 106 compresses, the first clutch spring 106 can bias the collar 102 in the first axial direction 126 such that the first clutch spring 106 can move the collar 102 toward the second position upon subsequent alignment of the splines 118, 124. In the example provided, the first clutch spring 106 is a coil spring disposed about the differential axis 68, radially inward of the extending portion 110 and radially outward of the first input member 74, though other types of biasing elements or configurations can be used.

The first clutch actuator 92 can be configured to axially translate the carrier 100. The first clutch actuator 92 can include a first actuator device 128 and a shift fork 130. The first actuator device 128 can be any suitable device for translating the shift fork 130 axially along the differential axis 68. For example, the first actuator device 128 can be a hydraulically actuated ram, a motor and lead screw, a ball-ramp actuator, or any other suitable linear actuator. The shift fork 130 can be configured to be linearly translated by the first actuator device 128 and can be coupled to a portion of the carrier 100 to linearly translate the carrier 100. In the example provided, the shift fork 130 is coupled for axial translation with the base portion 108.

The second clutch mechanism 60 can include a second clutch 150 and a second clutch actuator 152. The second clutch 150 can include a second input member 160, a second output member 162, and a second clutch spring 164. The second input member 160 can be non-rotatably, but axially slidably coupled to the first input member 74 for common rotation therewith. In the example provided, the second input member 160 is co-axially disposed about the first input member 74, radially outward of the collar 102 and the extending portion 110 of the carrier 100, and includes an interior spline or teeth 166 that is non-rotatably, but axially slidably engaged with an outer mating spline or teeth 168 formed on the extending portion 110 of the carrier 100. The second input member 160 can also include a first friction surface 170. The second output member 162 can include a second friction surface 172 facing toward the first friction surface 170. The second output member 162 can be coupled to the first output member 104 for common rotation therewith. The second clutch spring 164 can be configured to bias the second input member 160 axially away from the second output member 162. In the example provided, the second clutch spring 164 is a coil extension spring disposed radially about the extending portion 110, axially between the base portion 108 and the second input member 160, and coupled to the carrier 100 and the second input member 160 to bias the second input member 160 in the direction opposite the first axial direction 126, though other types of biasing members and configurations can be used. The first and second friction surfaces 170, 172 can be configured to transmit rotary power when in contact with each other. The first and second friction surfaces 170, 172 can be configured to transmit a relatively low amount of torque, such that engagement between the first and second friction surfaces 170, 172, can synchronize the rotation of the second differential pinion 84 and the other of the axle shafts 62 (i.e. the axle shaft 62 not coupled for common rotation with the first differential pinion 82). The first and second friction surfaces 170, 172 can be configured such that the second input member 160 and second output member 162 do not transmit the full drive torque provided by the first input member 74 when the ring gear 54 receives input torque from the input pinion 52.

The second clutch actuator 152 can be configured to axially translate the second input member 160 along the differential axis 68. In the example provided, the second clutch actuator 152 includes an electromagnet 180 disposed axially in-line with the second input member 160 and second output member 162, though other types of linear actuators and configurations can be used. The electromagnet 180 can create a magnetic field configured to overcome the second clutch spring 164 to attract the second input member 160 axially toward the second output member 162 when an electric current is provided to the electromagnet 180. In the example provided, the second output member 162 is axially between the second input member 160 and the electromagnet 180 and the electromagnet 180 is radially outward of the extending portion 110 of the carrier 100.

In operation, when rotary power is to be transmitted from the input pinion 52 to the rear wheels 38, the second clutch actuator 152 can be activated to bring the second input member 160 and second output member 162 into engagement to synchronize the rotation of the other of the axle shafts 62 (i.e. the axle shaft 62 not coupled for common rotation with the first differential pinion 82) with the second differential pinion 84. In the example provided, the magnetic field provided by the electromagnet 180 can be strong enough to induce synchronized rotation while being insufficient to prevent slipping of the first and second friction surfaces 170, 172, when under sufficient load. It is appreciated that perfect synchronization is not necessary.

After the components of the rear axle assembly 26 are up to speed, or synchronized, the first clutch actuator 92 can be activated to translate the carrier 100 in the first axial direction 126. Axial translation of the carrier 100 in the first axial direction 126 can cause the base portion 108 to axially translate the first clutch spring 106 in the first axial direction 126. Axial translation of the first clutch spring 106 in the first axial direction 126 can cause the first clutch spring 106 to press against the collar 102 to axially translate the collar 102 in the first axial direction 126. Axial translation of the collar 102 can bring the collar 102 into engagement with the first output member 104 and the first input member 74 to transfer rotary power therebetween. When the rear axle assembly 26 is in a connected mode (i.e. the collar 102 engages the first output member 104 and the first input member 74 for common rotation), then the synchronization function of the second clutch 60 is no longer needed and the second clutch actuator 152 can be deactivated. Deactivation of the electromagnet 180 can allow the second clutch spring 164 to translate the second input member 160 in the direction opposite the first axial direction 126, to disengage the second input member 160 from the second output member 162.

To return the rear axle assembly 26 to a disconnected mode (i.e. the collar 102 does not engage both of the first output member 104 and the first input member 74 for common rotation), the first clutch actuator 92 can be reversed to translate the carrier 100 in the direction opposite the first axial direction 126. The return member 116 can engage the collar 102 to translate the collar 102 in the direction opposite the first axial direction 126, to move the collar 102 out of engagement with the first output member 104. It is appreciated that when the rear axle assembly 26 is disconnected, power does not need to be maintained to either the first or second actuator 92, 152, to maintain the rear axle assembly 26 in the disconnected mode. It is further appreciated that once the first clutch mechanism 58 is engaged to transmit rotary power from the second differential pinion 84 to the first output member 104, power does not need to be maintained to either the first or second actuator 92, 152, to maintain the rear axle assembly 26 in the connected mode.

Figure 3:
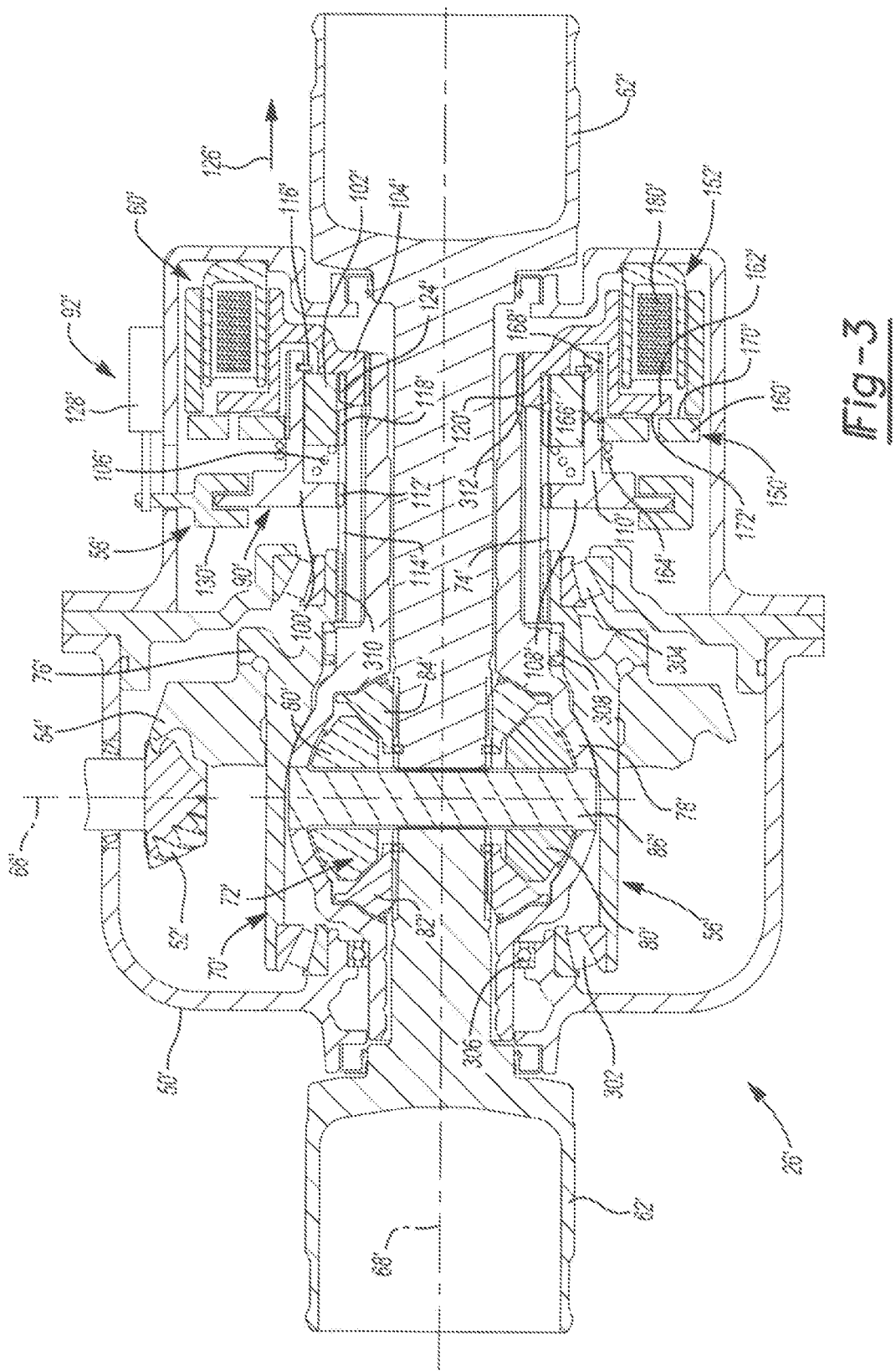
FIG. 3 is a sectional view of a portion of a second disconnecting driveline constructed in accordance with the teachings of the present disclosure.

With reference to FIG. 3, a second construction of a rear axle assembly is shown with reference numeral 26'. Rear axle assembly 26' is similar to rear axle assembly 26 and similar components are shown having similar primed reference numerals. Accordingly, the descriptions of similarly numbered elements from rear axle assembly 26 are incorporated herein by reference and only differences will be discussed in detail. Specifically, the first case member 76' of the differential case 70' can be separate from and rotatable relative to the second case member 78'. In the example provided, the first case member 76' is disposed concentrically about the second case member 78' and is supported within the housing 50' by bearing 302 and 304. Bearings 302, 304 can be disposed between the housing 50' and the first case member 76'. In the example provided the second case member 78' is supported rotatably within the first case member 76' by bearing 306 and bearing 308. Bearing 306 can be disposed between the second case member 78' and the housing 50'. Bearing 308 can be disposed between the second case member 78' and the first case member 76'. The first differential pinion 82' can be coupled to one of the axle shafts 62' for common rotation therewith. The second differential pinion 84' can be coupled to the other of the axle shafts 62' for common rotation therewith, instead of being coupled for common rotation with the first input member 74' as is the case with rear axle assembly 26.

The first input member 74' can be disposed radially between the first and second case members 76', 78' and can be supported about the second case member 78' for rotation relative to the second case member 78'. The first input member 74' can be coupled to the first case member 76' for common rotation therewith. In the example provided, the outer mating spline or teeth 114' can engage an inner spline or teeth 310 formed on the first case member 76' to couple the inner case member 76' and the first input member 74' for common rotation.

The first and second clutch mechanisms 58' and 60' can be configured similarly to the first and second clutch mechanisms 58 and 60 with regard to the first input member 74' and the first and second output members 104', 162'. In contrast to the first clutch mechanism 58, the first output member 104' can be coupled for common rotation with the second case member 78', instead of the other of the axle shafts 62'. In the example provided, the inner spline or teeth 120' of the first output member 104' can be non-rotatably coupled to an outer spline or teeth 312 formed on the second case member 78' to couple the first output member 104' and the second case member 78' for common rotation. In contrast to the second clutch mechanism 60, the second clutch mechanism 60' can synchronize the rotation of the first and second case members 76', 78' of the differential assembly 56', instead of the rotation of the second differential pinion 84' and the other of the axle shafts 62'.

Operation of the rear axle assembly 26' is similar to operation of the rear axle assembly 26. When rotary power is to be transmitted from the input pinion 52' to the rear wheels 38 (FIG. 1), the second clutch actuator 152' can be activated to bring the second input member 160' and second output member 162' into engagement to synchronize the rotation of the first and second case members 76', 78'. In the example provided, the magnetic field provided by the electromagnet 180' can be strong enough to induce synchronized rotation while being insufficient to prevent slipping of the first and second friction surfaces 170', 172', when under sufficient load. It is appreciated that perfect synchronization is not necessary.

After the components of the rear axle assembly 26' are up to speed, or synchronized, the first clutch actuator 92' can be activated to translate the carrier 100' in the first axial direction 126'. Axial translation of the carrier 100' can cause the base portion 108' to axially translate the first clutch spring 106' in the first axial direction 126'. Axial translation of the first clutch spring 106' in the first axial direction 126' can cause the first clutch spring 106' to press against the collar 102' to axially translate the collar 102' in the first axial direction 126'. Axial translation of the collar 102' can bring the collar 102' into engagement with the first output member 104' and the first input member 74' to transfer rotary power therebetween and thus transfer rotary power between the first and second case members 76', 78'. When the rear axle assembly 26' is in a connected mode (i.e. the collar 102' engages the first output member 104' and the first input member 74' for common rotation), then the synchronization function of the second clutch 60' is no longer needed and the second clutch actuator 152' can be deactivated. Deactivation of the electromagnet 180' can allow the second clutch spring 164' to translate the second input member 160' in the direction opposite the first axial direction 126', to disengage the second input member 160' from the second output member 162'.

To return the rear axle assembly 26' to a disconnected mode (i.e. the collar 102' does not engage both of the first output member 104' and the first input member 74' for common rotation), the first clutch actuator 92' can be reversed to translate the carrier 100' in the direction opposite the first axial direction 126'. The return member 116' can engage the collar 102' to translate the collar 102' in the direction opposite the first axial direction 126', to move the collar 102' out of engagement with the first output member 104'. It is appreciated that when the rear axle assembly 26' is disconnected, power does not need to be maintained to either the first or second actuator 92', 152', to maintain the rear axle assembly 26' in the disconnected mode. It is further appreciated that once the first clutch mechanism 58' is engaged to transmit rotary power from the first case member 76' to the second case member 78', power does not need to be maintained to either the first or second actuator 92', 152', to maintain the rear axle assembly 26' in the connected mode.

Thus, the rear axle assemblies 26 and 26' allow for synchronization and torque transfer in a disconnecting all-wheel drive driveline component without the drag and other parasitic losses associated with typical wet clutches.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A disconnecting driveline component comprising:
   a housing;
   an input gear received in the housing;
   a ring gear received in the housing and being meshingly engaged with the input gear to receive power therefrom, the ring gear being rotatable about an axis;
   a differential assembly received in the housing and including:
      a differential case being coupled to the ring gear for common rotation about the axis; and
      a differential gearset being coupled to the differential case to receive rotary power therefrom, the differential gearset having a pair of output members;
   a first shaft coupled to one of the pair of output members for rotation therewith about the axis;
   an axle shaft;
   a clutch device including:
      a clutch input member being coupled to the first shaft for rotation therewith about the axis;
      a clutch output member being coupled to the axle shaft for rotation therewith about the axis;
      a carrier being axially movably but non-rotatably coupled to the clutch input member; and
      a collar being axially-slidably but non-rotatably coupled to one of the carrier and the clutch input member for movement along the axis between a first position, in which the collar is coupled to the clutch output member to transmit rotational power therebetween, and a second position in which the collar is rotatably decoupled from the clutch output member; and
   a pilot clutch device including:
      a pilot input member being axially-slidably but non-rotatably coupled to the carrier;
      a pilot output member being fixedly coupled to the clutch output member; and
      a pilot actuator being selectively operable for moving the pilot input member into frictional engagement with the pilot output member.

2. The disconnecting driveline component of claim 1, wherein a spring is disposed between the pilot input member and the carrier and configured to bias the pilot input member away from the pilot output member.

3. The disconnecting driveline component of claim 2, wherein the pilot actuator includes an electromagnet selectively operable for generating a magnetic field, the magnetic field configured to overcome the spring and draw the pilot input member into frictional engagement with the pilot output member.

4. The disconnecting driveline component of claim 1, wherein a spring is disposed between the carrier and the collar and configured to bias the collar toward the first position when the collar is axially translated from the second position to the first position.

5. The disconnecting driveline component of claim 1, wherein the carrier comprises a plate member and a tubular member that is fixedly coupled to the plate member, the plate member defining an internally splined aperture that is engaged to an externally splined portion of the clutch input member.

6. The disconnecting driveline component of claim 5, wherein the collar is slidably received in the tubular member.

7. The disconnecting driveline component of claim 1, wherein the clutch device further includes a clutch fork that is engaged to the carrier to axially translate the carrier.

8. The disconnecting driveline component of claim 1, wherein the pilot actuator includes an electromagnet fixedly coupled to the housing.

9. A disconnecting driveline component comprising:
   a housing;
   an input gear received in the housing;
   a ring gear received in the housing and being meshingly engaged with the input gear to receive power therefrom, the ring gear being rotatable about an axis;
   a differential assembly received in the housing and including:
      a differential case including a first case member, which is coupled to the ring gear for common rotation about the axis, and a second case member; and
      a differential gearset being coupled to the second case member to receive rotary power therefrom, the differential gearset having a pair of output members;
   a clutch device including:
      a clutch input member being coupled to the first case member for rotation therewith about the axis;
      a clutch output member being coupled to the second case member for rotation therewith about the axis;
      a carrier being axially movably but non-rotatably coupled to the clutch input member; and
      a collar being axially-slidably but non-rotatably coupled to one of the carrier and the clutch input member for movement along the axis between a first position, in which the collar is coupled to the clutch output member to transmit rotational power therebetween, and a second position in which the collar is rotatably decoupled from the clutch output member; and
   a pilot clutch device including:
      a pilot input member being axially-slidably but non-rotatably coupled to the carrier;
      a pilot output member being fixedly coupled to the clutch output member; and a pilot actuator being selectively operable for moving the pilot input member into frictional engagement with the pilot output member.

10. The disconnecting driveline component of claim 9, wherein a spring is disposed between the pilot input member and the carrier and configured to bias the pilot input member away from the pilot output member.

11. The disconnecting driveline component of claim 10, wherein the pilot actuator includes an electromagnet selectively operable for generating a magnetic field, the magnetic field configured to overcome the spring and draw the pilot input member into frictional engagement with the pilot output member.

12. The disconnecting driveline component of claim 9, wherein a spring is disposed between the carrier and the collar and configured to bias the collar toward the first position when the collar is axially translated from the second position to the first position.

13. The disconnecting driveline component of claim 9, wherein the carrier comprises a plate member and a tubular member that is fixedly coupled to the plate member, the plate member defining an internally splined aperture that is engaged to an externally splined portion of the clutch input member.

14. The disconnecting driveline component of claim 13, wherein the collar is slidably received in the tubular member.

15. The disconnecting driveline component of claim 9, wherein the second case member is supported for rotation within the housing relative to the first case member.

16. The disconnecting driveline component of claim 9, wherein the pilot actuator includes an electromagnet fixedly coupled to the housing.

17. A disconnecting driveline component comprising:
a housing;
an input gear received in the housing;
a ring gear received in the housing and meshingly engaged with the input gear to receive power therefrom, the ring gear being rotatable about an axis;
a differential assembly received in the housing and including:
  a differential case; and
  a differential gearset being coupled to the differential case to receive rotary power therefrom, the differential gearset having a pair of output members;
a shaft coupled to one of the pair of output members;
a clutch device being configured to selectively permit transmission of rotary power between the ring gear and the shaft, the clutch device including:
  a clutch input member coupled for common rotation with one of the ring gear and the one of the pair of output members;
  a clutch output member coupled for common rotation with one of the differential case and the shaft; and
  a collar that is axially-slidable along the axis between a first position, in which the collar couples the clutch input member to the clutch output member to transmit rotational power therebetween, and a second position in which the collar is rotatably decoupled from one of the clutch input member and the clutch output member; and
a pilot clutch device including:
  a pilot input member being axially slidably but non-rotatably coupled to the clutch input member;
  a pilot output member being fixed to the clutch output member; and
  an electromagnet being selectively operable for generating a magnetic field that draws the pilot input member into frictional engagement with the pilot output member, the pilot clutch coupling the clutch input member to the clutch output member when the pilot input member frictionally engages the pilot output member and the collar is in the second position.

18. The disconnecting driveline component of claim 17, wherein the shaft is coupled for common rotation with the one of the pair of output members when the collar is in the first and second positions.

19. The disconnecting driveline component of claim 17, wherein the shaft is rotatably decoupled from the one of the pair of output members when the collar is in the second position, and is coupled for common rotation with the one of the pair of output members when the collar is in the first position.

20. The disconnecting driveline component of claim 17, wherein the clutch device further includes a spring configured to bias the collar toward the first position when the collar is axially translated from the second position to the first position.

* * * * *